Aug. 11, 1936.  J. F. QUEREAU ET AL  2,050,629
ELECTRIC TELEMETERING SYSTEM
Filed May 11, 1934    2 Sheets-Sheet 1
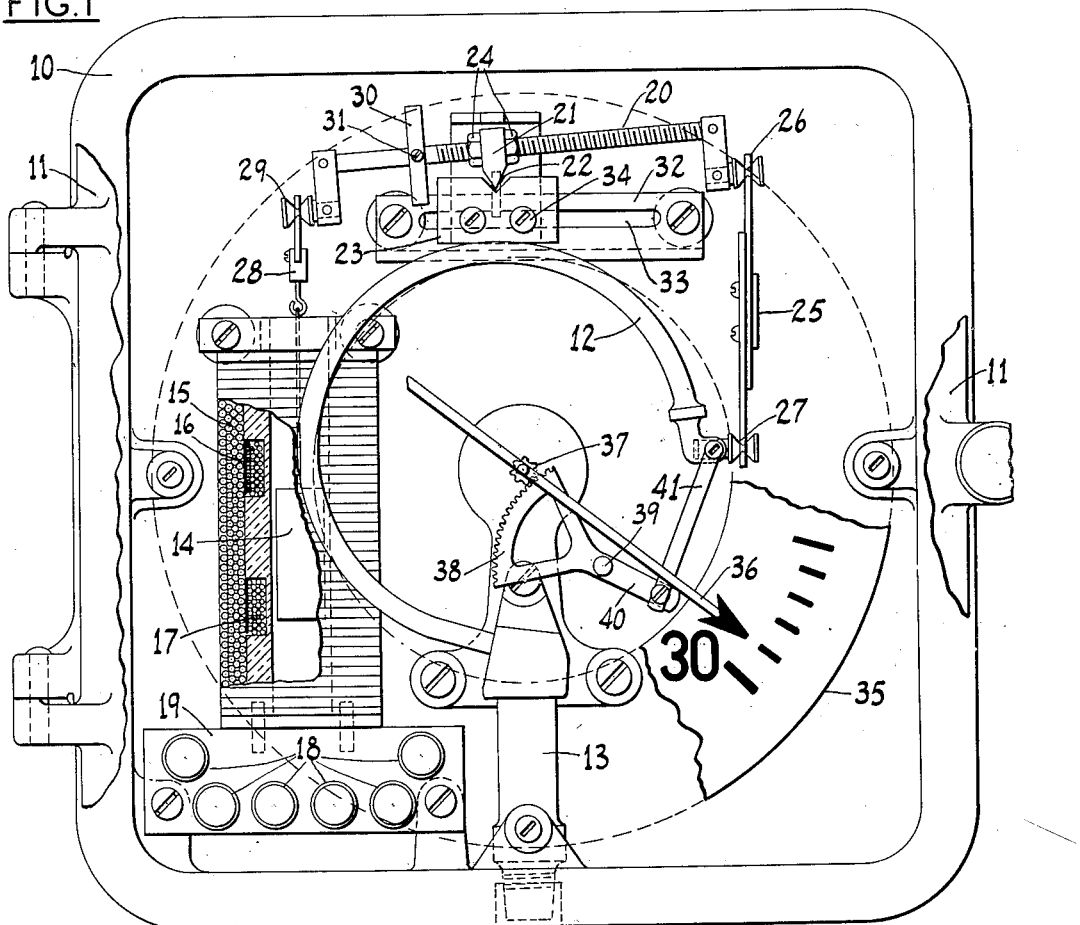
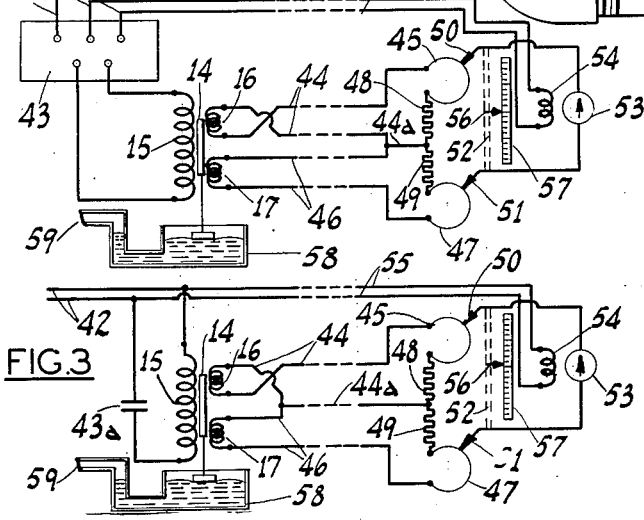
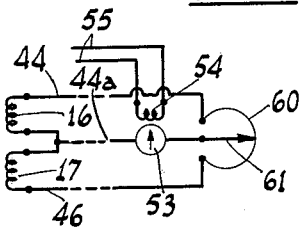
INVENTORS
John H. Quereau and
Albert J. Williams Jr.
BY Cornelius D. Ehret
their ATTORNEY Aug. 11, 1936.  J. F. QUEREAU ET AL  2,050,629
ELECTRIC TELEMETERING SYSTEM
Filed May 11, 1934   2 Sheets—Sheet 2
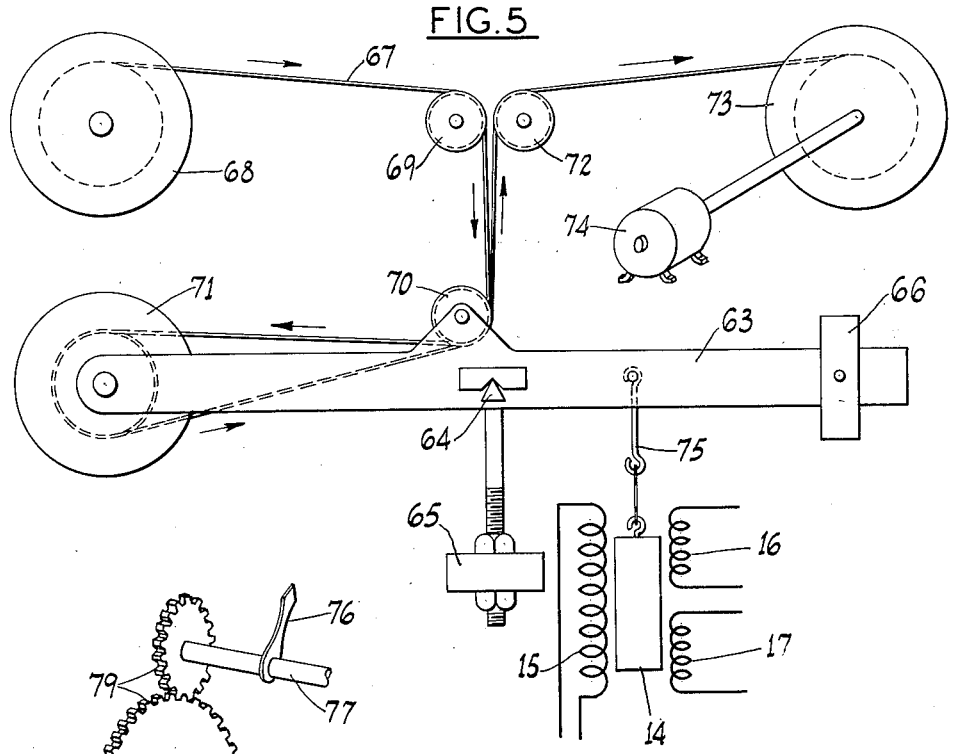
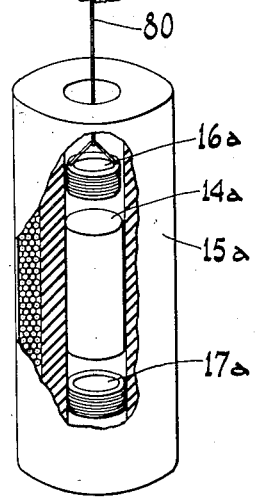
INVENTORS
John F. Quereau and
Albert J. Williams Jr.
BY
Cornelius D. Ehret
their ATTORNEY.

Patented Aug. 11, 1936

2,050,629

UNITED STATES PATENT OFFICE 2,050,629

ELECTRIC TELEMETERING SYSTEM

John F. Quereau, La Fayette Hill, and Albert J. Williams, Jr., Philadelphia, Pa., assignors to Leeds & Northrup Company, Philadelphia, Pa., a corporation of Pennsylvania Application May 11, 1934, Serial No. 725,172

25 Claims. (Cl. 177—351)

Our invention relates to electric telemetering systems and more particularly to such systems for obtaining an indication, at a distance, of the position or movement of a movable body, which movement may be either the primary effect to be measured, or a secondary effect, dependent upon, and responsive to, any variable quantity such as weight, pressure, temperature, differential pressure, fluid flow, etc.

There have been devised heretofore certain electric telemetering systems in which the motion of a movable body is transmitted to a distance by means including an inductance-resistance bridge, the primary or transmitting movable member being effective to vary the inductance arms of the bridge and the secondary or receiving movable element being associated with a device for balancing the bridge through the resistance arms. Such arrangements, however, have presented a number of practical difficulties. The resistance components of the two inductance arms of the bridge are constant in magnitude and independent of the position of the movable core while, of course, the reactance of such elements varies within wide limits. The result is that, with variations in position of the movable core of the inductance arms of the bridge, the phase angle of the current delivered to the balancing circuit varies, with the result that the current flowing through the measuring arm of the bridge cannot be reduced to zero and, at the apparent balance point, there is still a large quadrature current through the balancing galvanometer in the arm. This quadrature current adversely affects the accuracy of the telemetering system. Furthermore, any change in the phase of the galvanometer field, occasioned by changes in the voltage of the system or other causes, introduces an additional error. Moreover, under these circumstances, the bridge circuit and the transmitting conductors are connected directly to the power supply which imposes certain limitations upon their design, in general requiring the inductance elements having a considerable reactance. In general, also, this type of apparatus has been relatively insensitive, requiring a relatively large movement of the movable core associated with the inductance arms of the bridge to secure adequate movement of the secondary or receiving movable element; these large movements involving the application of considerable operating forces.

In accordance with our invention, an improved telemetering system comprises a master or transmitting movable member, and an inductive winding and associated magnetizable member or core member. A pair of additional windings is in energy-transferring relationship with the inductive winding and preferably comprises secondary windings of a transformer, the primary of which consists of the first-mentioned inductive winding. One or both of the windings of said pair and the magnetizable member are movable relative to each other and at least one of these elements is movable with the master or transmitting member.

A receiving system, including an indicating device, is connected in circuit with the pair of windings for giving a response which is a measure of the movement of the master or transmitting movable member. This system may include an indicating scale or may comprise any secondary or receiving movable member effective directly or indirectly to indicate, control, or regulate any desired apparatus or system. Preferably, the receiving system includes apparatus connected in circuit with the indicating device and the pair of windings for balancing the indicating device; more specifically, the balancing apparatus comprises resistance provided with a movable contact, component portions of the resistance device and the secondary windings forming a bridge circuit across which is connected the indicating device. The movement of the movable contact of the balancing apparatus is a measure of the movement of the primary or transmitting movable member.

Telemetering systems of our invention are characterized by extreme sensitivity requiring a minimum relative motion between movable parts for full range operation of the receiving or secondary member and involving a minimum operating force for the primary system. For example, our invention has been embodied in a telemetering system in which the maximum relative motion of the primary elements was ±0.08 inch for full range of operation of the secondary member and in which the maximum operating force was 0.07 gram.

For a better understanding of our invention, together with other and further features thereof, reference is had to the following description, taken in connection with the accompanying drawings, and its scope will be pointed out in the appended claims.

Referring to the drawings, Fig. 1 illustrates an embodiment of a primary or transmitting movable apparatus suitable for use in connection with our improved electric telemetering systems;

Fig. 2 is a circuit diagram of one embodiment of our improved electric telemetering systems to which may be applied the apparatus of Fig. 1;

Figs. 3 and 4 are circuit diagrams of modified forms of the electric telemetering system shown in Fig. 2;

Fig. 5 illustrates the application of our telemetering systems to the continuous measurement of the weight of a travelling strip or filament, and Fig. 6 shows a modified form of the primary movable system as applied to the measurement of the angular position of a pivoted shaft.

Referring now more particularly to Fig. 1 of the drawings, there is shown a primary or motion transmitting mechanism comprising an enclosing and supporting casing or housing 10 provided with a suitable hinged cover member 11, largely broken away in the figure for the sake of clarity. Supported in the casing 10 is a pressure-responsive device, in this case illustrated as a Bourdon tube 12, which, as is well understood in the art, comprises an elastic tube sealed at one end and bent to form a spiral or circular member, the other end of the tube 12 being connected to an inlet pipe 13 which, in turn, is connected to any suitable source of fluid pressure of which a remote measurement is desired.

The sealed end of the Bourdon tube 12 is connected through motion-transmitting mechanism to the movable member of an electromagnetic primary or transmitting mechanism. This mechanism comprises a primary winding, a pair of secondary windings inductively related thereto, and a magnetizable member, the magnetizable member and one or both of the secondary windings being relatively movable. For example, the magnetizable member may be movable and may comprise a magnetic core or armature 14 located within a stationary elongated coil or winding 15. The coil 15 preferably extends for a suitable distance beyond each end of the core member 14, as illustrated. Associated with the coil 15 is a pair of windings or coils 16 and 17 inductively related to the coil 15 and preferably comprising a pair of concentrated windings or coils mounted concentrically with respect to the coil 15 near or adjacent the ends of the movable core member 14. The coils 15, 16 and 17 preferably comprise a unitary structure suitably supported rigidly in the housing 10 and constituting, in effect, a stationary transformer with a movable or adjustable magnetic core member. The ends of the coils 15, 16 and 17 may be brought out to suitable terminals 18 of a terminal board 19 secured to the casing 10.

Any suitable motion-transmitting mechanism may be utilized to interconnect the sealed end of the Bourdon tube 12 to the movable core member 14. By way of example only, I have illustrated such a mechanism comprising a balancing beam 20 supported by a knife edge 21 resting in a recess 22 in a bearing block 23. As illustrated, the knife edge 21 is adjustable along the balancing beam 20 and may be secured at any desired position by means of lock nuts 24. One end of the beam 20 is connected to the sealed end of the Bourdon tube 12 through an adjustable link 25 connected by knife edge bearings 26 and 27 to the end of the beam 20 and the end of the tube 12, respectively.

The core member 14 is supported from the other end of the beam 20 by means of link 28 suspended from a knife-edge bearing 29. If desired, a balancing weight 30 may be mounted on the beam 20 and adjustably secured by a set screw 31 to maintain the movable system in a desired state of balance. In addition, the bearing block 23 may be adjustable along a carriage 32 provided with a slot 33 cooperating with suitable pins or screws 34 of the bearing block 23. The purpose of adjusting the bearing block 23 is, obviously, to maintain the ends of the balancing beam 20 and the supporting knife edges 26 and 29 in vertical alignment with the movable end of the Bourdon tube 12 and the axis of coil 15, respectively, for various positions of the knife edge 21 on the beam 20.

If desired, the measurement of the pressure within the tube 13 may be indicated at the apparatus itself by means of a dial scale 35, (largely broken away in the drawings for the sake of clarity) supported from the casing 10, and a cooperating pointer 36 mounted on a pinion 37 pivotally supported at the center of the dial 35. The pinion 37 is operated by a toothed sector 38 pivoted at 39 and having a projecting arm 40 connected to the movable end of the Bourdon tube 12 through link 41.

The operation of the above-described primary or motion-transmitting apparatus, in response to variations in the fluid pressure supplied to the inlet 13, will be apparent to those skilled in the art. As the pressure rises and falls, the tube 12 expands and contracts, raising and lowering the outer or sealed end of the tube 12, which motion is transmitted through the mechanism comprising the beam 20 and links 25 and 28 to the movable core member 14. As the core member 14 falls and rises, it decreases and increases, respectively, the magnetic coupling between the coil 15 and the coil 16 and, at the same time, increases and decreases, respectively, the coupling between coil 15 and coil 17. With the primary winding 15 connected to a suitable source of alternating current, the rise of the core member 14 produces an increase in the voltage of the coil 16 and a simultaneous decrease in the voltage of the coil 17, or vice versa.

The coil 16 is connected over the conductors 44 to an adjustable resistance, such as a slidewire 45, located at the receiving station. Similarly, the coil 17 is connected over the conductors 46 to the slidewire 47. Preferably impedances, such as resistors 48 and 49, are connected in series with the slidewires 45 and 47, respectively, to increase the operating range of the receiving system for a given movement of the primary system. As indicated, the polarity of one of the coils, in this case the coil 16, is reversed in respect to that of the coil 17 and their adjacent conductors 44 and 46 are connected together, as at 44a, and to the junction between resistors 48 and 49. With these connections, the outer conductors 44 and 46 and outer terminals of the slidewires 45 and 47 have the same polarity with respect to their common connection. The slidewires 45 and 47 are provided with adjustable contacts 50 and 51, respectively, movable together as by a mechanical connection indicated by the dotted lines 52. The contacts 50 and 51 are interconnected through an indicating device, such as a galvanometer 53, provided with a field winding 54, connected to one phase of the supply circuit 42 over the conductors 55. The mechanical connection between the adjustable contacts 50 and 51 may carry a suitable pointer or indicating device and a cooperating scale indicated schematically at 56 and 57, respectively.

In considering the operation of the above-described apparatus, it will be assumed that the pressure obtaining at the inlet 13 is normal, and the movable mechanism of the pressure-responsive apparatus is adjusted so that the movable core member occupies its neutral or mid-position, with the result that the voltages generated in the secondary coils 16 and 17 are equal. Under these conditions, the indicating device or galvanometer 53 will be balanced when the adjustable contacts 50 and 51 are in substantially the mid-positions of their cooperating slidewires 45 and 47, respectively; this position of balance being indicated by zero deflection of the device 53.

If the pressure in the inlet 13 should rise, the movable member 14 will be correspondingly lowered, the voltage generated in coil 16 will decrease, and that in the coil 17 increase; and, in order to balance the indicating device 53, the adjustable contacts 50 and 51 must be moved upwardly, as referred to Fig. 2. This movement will increase the portion of the voltage of the coil 16 derived from the potentiometer, including the resistance 48 and the slidewire 45, and will correspondingly decrease that derived from the coil 17. The amount of the movement of the adjustable contacts 50 and 51 will be a measure of the change in pressure at the inlet 13 and, with a proper calibration, the pointer 56, associated with the movable contacts 50, 51, will indicate the actual pressure in the inlet 13. Obviously, upon a fall in pressure in the inlet 13, the reverse operation takes place.

If a less accurate measurement of pressure is satisfactory, the adjustable contacts 50, 51 may be moved to balance the system for normal pressure at the inlet 13, in which case the deflection of the indicating device 53 may be used as an approximate indication of the pressure obtaining. The error in such use is, of course, occasioned by the resistance drops in the system due to the galvanometer current.

The main transmitting mechanism between the tube 12 and the movable core member 14 may be adjusted to move the core member 14 within its normal range of operation for normal variations in pressure at the inlet 13. Similarly, by proper selection of resistors 48 and 49, this may correspond to a full range operation of the receiving mechanism. By concentrating the secondary windings 16 and 17, near or adjacent the ends of the movable core member 14, a relatively small movement of the core member 14 produces relatively large variations in the voltages induced in the coils 16 and 17, requiring relatively large adjustments of the contacts 50 and 51. Thus, the motion of the end of the Bourdon tube 12 may be amplified or decreased in accordance with the requirements of the system. As stated above, such an apparatus has been embodied in a telemetering system requiring a movement of only 0.08 inch of the travel of the core member 14 on each side of neutral for the full range of operation of the receiving element, and involving a maximum operating force on the core member 14 of only 0.07 gram.

The purpose of the phase-shifting device 43 is to bring the currents in the resistances 45, 47, 48, 49 and thus their terminal voltages, in proper phase with the current in the field winding 54 of the galvanometer 53 to secure accurate operation of this indicating device.

In the above-described system, the accuracy of indication at the receiving station is entirely independent of the distance between the stations or the resistances of the conductors, provided only that the loop resistances of the two pairs of conductors are equal. Hence, when the receiving and transmitting stations are separated by a suitable distance and/or when the resistance of the interconnecting conductors may be appreciable in respect to the resistances of the other elements of the system, the arrangement of Fig. 2 is preferable. However, when the stations are relatively close, or the resistance of the interconnecting conductors is relatively low, or where extreme accuracy is not required, the systems of Figs. 3 or 4 may be utilized to advantage.

In the arrangement of Fig. 3, the connection between the coils 16 and 17 is made at the transmitting station so that a single conductor 44a replaces the two conductors of Fig. 2 connected in the receiving station at 44a, and thus permits the use of only three wires interconnecting the stations. In this case, also, the proper phase relation between the field and armature currents of the galvanometer 53 is secured by a phase-adjusting impedance, such as a condenser 43a connected in series with the primary winding 15. In this system, the movable core member 14 is shown, by way of modification, as being operated in response to the fluid level of a mercury manometer 58 which measures the pressure within a fluid-conductor 59. In all respects, the operation is similar to that described above in connection with Fig. 2. As the movable core member 14 is raised and lowered in response to variations in pressure in the fluid conductor 59, the voltage distribution between the coils 16 and 17 is varied and, as the indicating device 53 is maintained in a balanced condition under the new voltage distribution, by means of the adjustable contacts 50 and 51, the position of these contacts, as indicated by the pointer 56 and the scale 57, is a measure of the pressure in the conductor 59.

In the system of Fig. 4, the two slidewires 45 and 47 of Figs. 2 and 3 are replaced by a single slidewire 60 and cooperating adjustable contact 61. The outer conductors 44 and 46 are connected to the outer terminals of the slidewire 60, while the central or neutral conductor 44a is connected to the adjustable contact through the galvanometer 53, and in all respects the connections are similar.

The operation of the system of Fig. 4 is substantially similar to that of the foregoing systems. As the voltage distribution between coils 16, 17 is varied in response to the movement of the primary movable member and connected core member 14, the system is balanced to reduce the deflection of the galvanometer 53 to zero by movement of the single adjustable contact 61, the position of this contact being a measure of the movement of the primary movable member. The error in this system is due to the effect of the resistance of the conductors upon the balancing position of the adjustable contact 61.

In Fig. 5 is shown an application of the telemetering system of our invention to the continuous weighing of a moving strand or filamentary thread. This apparatus comprises a scale-beam 63 supported from a knife edge 64 and provided with an adjustable balancing weight 65 and counterweight 66. The strand or filamentary thread 67 to be weighed is supplied from a feed reel 68 and passes over a stationary idler pulley 69 and one of a pair of idler pulleys 70 supported from the scale beam 63 near its fulcrum 64, thence around a guide reel 71 journalled at the outer end of the beam 63; over the other idler pulley 70, the stationary idler pulley 72, and a re-wind reel 73 driven by any suitable device, such as a motor 74. The movable core member 14 depends from the scale beam 63 through a linkage mechanism 75. The arrangement of the movable core member 14 and the primary and secondary coils 15, 16 and 17 is substantially similar to that shown in Fig. 1.

The operation of the apparatus of Fig. 5 will be clearly understood from the following description. As the strand or filamentary thread 67 passes continuously over the guide reel 71, the length of the thread supported between the idler pulleys 70 and the guide reel 71 is constant so that the total weight of the thread will depend solely upon its weight per unit length. Any variations from normal in this unit weight will tend to unbalance the scale beam 63, transmitting a motion to the movable core member 14 which, in turn, is transmitted to the receiving station by any of the circuits of Figs. 2, 3 or 4. It will be noted that the indication of the weight of the strand or thread is completely independent of the speed at which it is wound upon the reel 73, as the length supported from the scale beam 63 is constant irrespective of the speed.

In Fig. 6 is illustrated a modification of the transmitting apparatus of Fig. 1 suitable for transmitting to the receiving station an indication of the angular position of a pointer or an arm 76 supported from a pivotally mounted shaft 77. The angular position of the pointer 76 is imparted to a pulley 78 through a reducing gearing 79. Upon the pulley 78 is wound a supporting cord 80 to which is attached a movable coil element 16a corresponding to the upper coil 16 of Fig. 1. In this arrangement the primary coil 15a and the other secondary coil 17a are arranged similarly to the apparatus of Fig. 1, but the core member 14a is stationary rather than movable, as is the core member 14 of Fig. 1. Since the voltage induced in the coil 17a is constant under all conditions, it may be connected directly to the supply circuit 42 either with or without the interposition of a transformer. The operation of the apparatus in Fig. 6 is similar to that described in connection with Figs. 2, 3 and 4. As the secondary coil 16a is raised or lowered in response to movements of the pointer 76 and the shaft 77, the voltages induced in the coils 16a and 17a become unbalanced. Any of the several receiving systems of Figs. 2, 3 and 4 may be utilized for obtaining an indication of this voltage unbalance. The arrangement of Fig. 6 may be advantageous in certain instances since the movable system comprises only elements which are very light in weight.

While we have described what we at present consider the preferred embodiments of our invention, it will be obvious to those skilled in the art that various changes and modifications may be made without departing from our invention, and we, therefore, aim in the appended claims to cover all such changes and modifications as fall within the true spirit and scope of our invention.

What we claim is:

1. A telemetering system comprising a movable member, an inductive winding, a pair of windings in energy-transmitting relationship with said inductive winding, at least one of the windings of said pair being inductively related thereto, means for varying the inductive coupling between said inductive winding and the winding or windings of said pair inductively related thereto, said means and at least one of said windings being relatively movable and one of said relatively movable elements being movable with said movable member, and means connected in circuit with said pair of windings and including a second movable member the position of which is representative of the position of said first-named movable member.

2. A telemetering system comprising a movable member, an inductive winding, a pair of windings inductively related to said inductive winding, means for varying the inductive coupling between said inductive winding and said pair of windings, said means and at least one of said windings being relatively movable and one of said relatively movable elements being movable with said movable member, and means connected in circuit with said pair of windings and including a second movable member the position of which is representative of the position of said first-named movable member.

3. A telemetering system comprising a movable member, an inductive winding and a cooperating magnetizable member, a pair of windings inductively related to said inductive winding, at least one of said windings and said magnetizable member being movable relative to each other and one of said relatively movable elements being movable with said movable member, and means connected in circuit with said pair of windings and including a second movable member the position of which is representative of the position of said first-named movable member.

4. A telemetering system comprising a movable member, a primary winding and a cooperating magnetizable member, an alternating current circuit for energizing said primary winding, a pair of secondary windings inductively related to said primary winding, at least one of said windings and said magnetizable member being relatively movable and one of said relatively movable elements being movable with said movable member, and means connected in circuit with said pair of secondary windings and including a second movable member the position of which is representative of the position of said first-named movable member.

5. A telemetering system comprising a movable member, an elongated primary winding, a cooperating magnetizable core member mounted within said winding, an alternating current circuit for energizing said primary winding, a pair of spaced concentrated secondary windings inductively related to said primary winding, at least one of said windings and said core member being relatively movable and one of said relatively movable elements being movable with said movable member, and means connected in circuit with said pair of windings and including a second movable member the position of which is representative of the position of said first-named movable member.

6. A telemetering system comprising a movable member, an elongated primary winding, a cooperating magnetizable core member mounted within said winding, said core member being substantially shorter than said primary winding and normally centrally located therein, an alternating current circuit for energizing said primary winding, a pair of concentrated secondary windings wound concentrically with respect to said primary winding and spaced near the ends of said core member when in its normal position, at least one of said windings and said magnetizable core member being relatively movable and one of said relatively movable elements being movable with said movable member, and means connected in circuit with said pair of windings and including a second movable member the position of which is representative of the position of said first-named movable member.

7. A telemetering system comprising a movable member, an inductive winding and a cooperating magnetizable member, a pair of windings inductively related to said inductive winding, at least one of the windings of said pair and said magnetizable member being relatively movable and one of said relatively movable elements being movable with said movable member, and means connected in circuit with said pair of windings and including a second movable member the position of which is representative of the position of said first-named movable member.

8. A telemetering system comprising a movable member, a stationary inductive winding, a magnetizable member inductively coupled with said winding and movable with said movable member, a pair of windings inductively related to said inductive winding, and means connected in circuit with said pair of windings and including a second movable member the position of which is representative of the position of said first-named movable member.

9. A telemetering system comprising a movable member, a stationary inductive winding and cooperating magnetizable member, a pair of windings inductively related to said inductive winding and at least one of them being movable with said movable member, and means connected in circuit with said pair of windings and including a second movable member the position of which is representative of the position of said first-named movable member.

10. A telemetering system comprising a movable member, an inductive winding and a cooperating magnetizable member, a pair of windings inductively related to said inductive winding, at least one of said windings and said magnetizable member being relatively movable and one of said relatively movable elements being movable with said movable member, an indicating device connected in circuit with said pair of windings, and means connected in circuit with said indicating device and said pair of windings for balancing said indicating device, said means including a second movable member, the position of which is representative of the position of said first-named movable member.

11. A telemetering system comprising a movable member, an inductive winding and a cooperating magnetizable member, a pair of windings inductively related to said inductive winding, at least one of said windings and said magnetizable member being relatively movable and one of said relatively movable elements being movable with said movable member, an indicating device connected in circuit with said pair of windings and differentially responsive to the energization thereof, and impedance means connected in circuit with said indicating device and said pair of windings for balancing said indicating device, said impedance means including a movable adjusting element the position of which is representative of the position of said first-named movable member.

12. A telemetering system comprising a movable member, an inductive winding and a cooperating magnetizable member, a pair of windings inductively related to said inductive winding, at least one of said windings and said magnetizable member being relatively movable and one of said relatively movable elements being movable with said movable member, a similar impedance device connected across each of said pair of windings, and an indicating device connected between points of said impedance devices, the connections of said indicating device to said impedance devices being adjustable and the position thereof being representative of the position of said first-named movable member.

13. A telemetering system comprising a movable member, an inductive winding and a cooperating magnetizable member, a pair of windings inductively related to said inductive winding, at least one of said windings and said magnetizable member being relatively movable and one of said relatively movable elements being movable with said movable member, a pair of similar resistance elements connected individually across said pair of windings, and an indicating device connected between points of said resistance elements, said resistance elements including an adjustable connection forming terminals for connection to said indicating device, the position of said adjustable connections being representative of the position of said first-named movable member.

14. A telemetering system comprising a movable member, an inductive winding and a cooperating magnetizable member, a pair of windings inductively related to said inductive winding, at least one of said windings and said magnetizable member being relatively movable and one of said relatively movable elements being movable with said movable member, an indicating device remote from said movable member, a plurality of conductors extending from said pair of windings to said indicating device and connected in circuit therewith, balancing impedance means adjacent said indicating device and connected in circuit therewith and with said conductors, and a movable element for adjusting a connection to said impedance means to balance said indicating device, the position of said adjusting element being representative of the position of said movable member.

15. A telemetering system comprising a member movable in accordance with variations of a quantity to be measured, an inductive winding and a cooperating magnetizable member, a pair of windings inductively related to said inductive winding, at least one of said windings and said magnetizable member being movable relative to each other, motion-transmitting mechanism interconnecting said movable member and the movable one of said winding and magnetizable member, and means connected in circuit with said pair of windings and including a second movable member the position of which is a measure of said quantity.

16. A telemetering system comprising an elastic deformable member subject to a pressure to be measured, a stationary inductive winding and a magnetizable member movable relative to said winding, motion-transmitting mechanism interconnecting the movable end of said deformable member and said magnetizable member, means for balancing the system of movable elements, a pair of windings inductively related to said inductive winding, and means connected in circuit with said pair of windings and including a movable member the position of which is a measure of said pressure.

17. A telemetering system comprising a movable member, a source of alternating current, a pair of inductive windings in energy-transmitting relationship with said source, means for varying the energy transmitting relationship between said source and at least one of the windings of said pair, said means being movable with said movable member, impedance devices individually connected across said windings, and an indicating device connected between points of said impedance devices, the connections of said indicating device to said impedance devices being adjustable and the position thereof being representative of the position of said movable member.

18. A telemetering system comprising a movable member, a source of alternating current, a pair of inductive windings in energy-transmitting relationship with said source, means for varying the energy transmitting relationship between said source and at least one of the windings of said pair, said means being movable with said movable member, a pair of equal impedance devices individually connected across said windings and each provided with an adjustable connection, an indicating device interconnecting said adjustable connections, and means for simultaneously adjusting said adjustable connections, the position of said adjusting means being representative of the position of said movable member.

19. A telemetering system comprising a movable member, a source of alternating current, a pair of inductive windings in energy-transmitting relationship with said source, means for varying the energy transmitting relationship between said source and at least one of the windings of said pair, said means being movable with said movable member, a pair of equal resistance devices individually connected across said windings and each provided with an adjustable connection, an indicating device interconnecting said adjustable connections, means for simultaneously and equally adjusting said adjustable connections in an opposite sense with respect to the voltages of said windings, and an indicating scale cooperating with said adjusting means to give an indication of the position of said movable member.

20. In a telemetering system including two sources of relatively varying voltage, a transmitting and receiving system comprising a pair of impedance devices individually connected to said sources, and an indicating device connected between points of said impedance devices, the connections of said indicating device to said impedance devices being adjustable and the position thereof being a measure of the difference between the voltages of said sources.

21. In a telemetering system including two sources of equally and oppositely varying voltage, a transmitting and receiving system comprising a pair of equal resistance devices individually connected to said sources and each provided with an adjustable connection, an indicating device interconnecting said adjustable connections, means for simultaneously and equally adjusting said adjustable connections in an opposite sense with respect to the voltages of said sources, and an indicating scale cooperating with said adjusting means to give a measure of the difference between the voltages of said sources.

22. A telemetric system comprising a transmitter including a source of alternating current, an inductive winding connected to said source, two windings for receiving energy from said source, at least one of which is inductively related to said first winding, conductors extending from said two windings to a receiving station, means movable in response to changes in magnitude of a condition to vary the inductive relation between said first winding and at least one of said two windings to vary the ratio of the voltages transmitted by said conductors while maintaining a constant phase relation between said voltages, and means at said receiving station movable in response to a change in ratio of said voltages.

23. A telemetric system comprising a transmitter including a primary winding, two secondary windings, conductors extending from said secondary windings to a receiving station, means movable in response to changes in magnitude of a condition to vary the inductive relation between said primary winding and at least one of said secondary windings to vary the ratio of the induced voltages transmitted by said conductors while maintaining a constant phase relation between said voltages, and means at said receiving station movable in response to change in ratio of said induced voltages.

24. A telemetric system comprising a transmitter including a primary winding, two secondary windings, two pairs of conductors, each pair extending from one of said secondary windings to a receiving station, means movable in response to changes in magnitude of a condition to vary the inductive relation between said primary winding and at least one of said secondary windings to vary the ratio of voltages across said pairs of conductors while maintaining a constant phase relation between said voltages, and means at the receiving station responsive to change in ratio of said voltages.

25. A telemetric system comprising a source of alternating current, a receiving station including an electro-responsive device having a winding energized from said source, a transmitter including a primary winding energized from said source, means for establishing a predetermined phase relation between the current in said primary winding and said winding of said electro-responsive device, two secondary windings, conductors from said secondary windings to said receiving station, means movable in response to change in magnitude of a condition for varying the inductive relation between said primary winding and at least one of said secondary windings to vary the ratio of the voltages across said conductors while maintaining a constant phase relation between said voltages, and a second winding for said electro-responsive device traversed by current upon change in ratio of said voltages.

JOHN F. QUEREAU.
ALBERT J. WILLIAMS, Jr.